United States Patent
Vitner

(10) Patent No.: US 8,628,736 B2
(45) Date of Patent: Jan. 14, 2014

(54) PROCESS FOR THE PRODUCTION OF TITANIUM SALTS

(75) Inventor: Asher Vitner, Jerusalem (IL)

(73) Assignee: Asher Vitner Ltd., Jerusalem (IL)

( * ) Notice: Subject to any disclaimer, the term of this patent is extended or adjusted under 35 U.S.C. 154(b) by 901 days.

(21) Appl. No.: 12/666,947

(22) PCT Filed: Jun. 29, 2008

(86) PCT No.: PCT/IL2008/000889
§ 371 (c)(1),
(2), (4) Date: May 27, 2010

(87) PCT Pub. No.: WO2009/001365
PCT Pub. Date: Dec. 31, 2008

(65) Prior Publication Data
US 2010/0257977 A1    Oct. 14, 2010

(30) Foreign Application Priority Data

Jun. 28, 2007 (IL) .......................... 184311
Jun. 26, 2008 (IL) .......................... 192452

(51) Int. Cl.
*C22B 34/12* (2006.01)
*C01G 23/02* (2006.01)

(52) U.S. Cl.
USPC ................. 423/85; 75/612; 423/82

(58) Field of Classification Search
None
See application file for complete search history.

(56) References Cited

U.S. PATENT DOCUMENTS

| 2,608,464 A * | 8/1952 | Aagaard et al. ............. 423/492 |
| 4,112,045 A * | 9/1978 | Seko et al. ...................... 423/7 |
| 5,395,497 A * | 3/1995 | Bourgeois ................... 204/537 |
| 2006/0062722 A1 | 3/2006 | Liou |
| 2008/0015487 A1 * | 1/2008 | Szamosfalvi et al. ....... 604/6.07 |
| 2009/0158895 A1 * | 6/2009 | Vitner et al. .................. 75/739 |

FOREIGN PATENT DOCUMENTS

| BE | 505183 A | 12/1952 |
| EP | 0005018 A | 10/1979 |
| WO | WO 2007043055 A1 * | 4/2007 |

OTHER PUBLICATIONS

B.G. Newland, R.A.J. Shelton An effusion study of the disproportionation of titanium tri-iodide Mar. 1970 Journal of the less common metals vol. 20, Issue 3 pp. 245-249.*

* cited by examiner

*Primary Examiner* — Roy King
*Assistant Examiner* — Jenny Wu
(74) *Attorney, Agent, or Firm* — Lucas & Mercanti, LLP

(57) ABSTRACT

The present invention provides a method for the Industrial production of a titanium salt TP, said method comprising the steps of: i. Precipitation of titanic acid from a solution comprising titanium salt TP1; ii. Production of a titanium containing product TP2 from a medium comprising of said titanic acid and an acid; and iii. Thermal conversion of titanium containing product TP3 to a titanium salt TP at temperature higher than 170° C.

31 Claims, No Drawings

PROCESS FOR THE PRODUCTION OF TITANIUM SALTS

CROSS-REFERENCE TO RELATED APPLICATIONS

This application is a 371 of PCT/IL2008/000889 filed Jun. 29, 2008, which claims the benefit of Israeli Patent Application Nos. 184311 filed on Jun. 28, 2007 and 192452 filed on Jun. 26, 2008, the contents of each of which are incorporated herein by reference.

The invention is directed to a process for the industrial production of titanium salts such as $TiCl_4$, $TiBr_4$, other titanium halide salts, titanium salts of mono-valent anions ($TiX_4$), titanium salts of di-valent anions—$TiX_2$ and titanium salts of tri-valent anions $Ti_3X_4$. In particular the present invention is directed to such a process without the addition of $O_2$ and/or $Cl_2$.

Titanium tetrachloride is typically produced by reacting titanium dioxide containing ore with chlorine in the presence of coke at a temperature of approximately 1000° C. in a fluidized bed reactor. The off-gas mainly contains the product $TiCl_4$ gas, together with CO gas, $CO_2$ gas and $N_2$ gas. In the chlorination step ore and coke should be available in large amounts with respect to chlorine to ensure a complete reaction of chlorine.

The chlorination process results in the release of a variety of contaminates, such as CO, $CO_2$ and other contaminates such as dioxins, into the atmosphere, which release must be prevented.

Titanium tetra halides can be produced by thermal conversion of titanium salts such as $TiCl_3$, $TiBr_3$ or $TiOCl_2$. The raw materials for such production are expensive and are usually produced for titanium tetra halides themselves by reduction or hydrolysis:

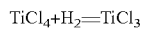

$TiCl_4 + H_2 = TiCl_3$

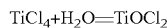

$TiCl_4 + H_2O = TiOCl_2$

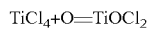

$TiCl_4 + O = TiOCl_2$

Titanyl chloride of high purity can be produced by carefully reacting $TiCl_4$ with water. The cost of highly purified $TiOCl_2$ is higher than that of $TiCl_4$. As a result $TiOCl_2$ is prohibitively expensive for the industrial production of $TiCl_4$.

Titanic acid is usually used for the production of $TiO_2$. It is produced in large amounts in the sulfate process. In this industrial production, the separation is done by heating a dilute solution at a relatively high temperature and in the presence of other contaminates. Since the resultant product was converted afterwards in the calcinations stage to $TiO_2$, no attempt was made to produce it in a way in which it can be dissolved.

It was surprisingly discovered that titanic acid can be precipitated in such a way that the produced titanic acid is easily dissolved in acid to get concentrated titanyl salt solutions. In the sulfate process for example, titanic acid is precipitated from the solution obtained by the leaching of Ilmenite. It is precipitated from the above solution by heating a non-pure solution that results in a product with a purity that is much lower than needed for the production of $TiCl_4$ and titanium metal.

The obtained product has a relatively low solubility in solution at low amount of acid halide (HX) solutions. As a result $TiOCl_2$, $TiOBr_2$, $TiOl_2$ are not produced industrially via this route in order to produce titanium tetra halide and titanium metal.

It was very surprisingly found that an industrial process for the production of $TiX_4$ can be achieved at a competitive production cost via an oxidative process. Such a process comprises the precipitation of titanic acid to produce titanic acid, dissolution of the titanic acid in acid solution and decomposition of a titanium salt at a temperature higher than 170° C.

The industrial process described in the present invention became feasible due to several discoveries and improvements that were made in the various stages of the process, which enabled the production of titanium salt at a purity level and cost required in the titanium industry, especially for the production of titanium metal.

It is an object of the present invention to provide a process for the production of $TiCl_4$ and other titanium salts ($TiX_4$) without the addition of $Cl_2$ or $O_2$, which process does not have the disadvantages of the release of undesired gases into the atmosphere.

The main use of the $TiCl_4$ and other titanium salts produced, according to the present invention, is as a raw material for the titanium metal industry.

DISCLOSURE OF THE INVENTION

With this stage of the art in mind, there is now provided, according to the present invention, a method for the industrial production of titanium (IV) containing products TP by thermal conversion of titanium salts, said method comprising the steps of:

i. Precipitation of titanic acid from a solution comprising titanium salt TP1;

ii. Production of a titanium containing product TP2 from a media comprising said titanic acid and an acid;

iii. Thermal conversion of titanium containing product TP3 to a titanium salt TP at temperature higher than 170° C.

The method further includes the production of titanium metal from said titanium product TP during the thermal conversion stage of TP3. In addition, the method relates to the production of other titanium salts by the thermal conversion of TP3.

In the following, the term HX relates to a strong acid having a pK value lower than 2.5 and X relates to the anion of that acid and of the various titanium salts.

In one embodiment of the present invention, X is chloride and TP is $TiCl_4$. In a preferred embodiment the anion X is selected from the group consisting of halides and monovalent anions (wherein TP is $TiX_4$), divalent anions (wherein TP is $TiX_2$) or trivalent anions (wherein TP is $Ti_3X_4$) and any combination thereof.

According to the present invention, the process is comprised of at least 3 stages:

1. The precipitation of titanic acid from titanium salt containing solution—the titanium containing salt of Stage 1 will be referred to as TP1.

2. Conversion of the titanic acid produced in Stage 1 to a titanium containing salt—the titanium containing salt of Stage 2 will be referred to as TP2.

3. Thermal conversion of titanium containing salt—TP3 to produce the titanium product.

Stage 1: Precipitation of Titanic Acid.

In the following, the term titanic acid relates to $TiO(OH)_2$, its hydrates $(TiO(OH)_2 * (H_2O)_n)$ or solvates $(TiO(OH)_2 * (HX)_n, (TiO(OH)_2 * (solvent)_n$, and also to any dehydrated or polymerized form of $TiO(OH)_2$ According to the present invention, the main production of titanic acid is performed via the procedure that includes:
1. leaching of titanium containing ore;
2. Purification of the produced titanyl salt ($TiOX_n$); and
3. Precipitation of titanic acid from said solution.

In a preferred embodiment of the present invention the titanyl salt TP1 is produced from a solution obtained by the leaching of Ilmenite or other titanium containing ores.

In order to produce $TiCl_4$ and other $TiX_4$ salts suitable for the production of titanium metal, its purity must be very high.

In a more preferred embodiment the titanyl salt TP1 is further purified to give a solution with a ratio between titanium to all polyvalent cations of higher than 97%.

In a more preferred embodiment the ratio between titanium to all polyvalent cations is higher than 99% and in a more preferred embodiment the ratio between titanium to all polyvalent cations is higher than 99.9%.

In a preferred embodiment the purification of the titanyl salt may be done using one or more conventional methods such as Extraction, Crystallization, and Separation upon ion exchangers or any other purification method.

In a more preferred embodiment the titanyl salt TP1 is further purified by the crystallization of its double salt. In a preferred embodiment of the present invention the double salt is selected from the group comprising of titanyl Monovalent-cation anions. In a preferred embodiment the titanyl double salt is titanyl ammonium sulfate. The precipitation of titanic acid from said double salt solution is done by adding a base to increase the pH.

In another preferred embodiment, the purification of the titanyl salt is done by it crystallization from the solution obtained after leaching. In a preferred embodiment, the crystallization is induced using a method selected from cooling, evaporation, addition of an anti solvent and the combination thereof.

In a preferred embodiment the anti solvent is an acid. In another preferred embodiment, the acid is $H_2SO_4$.

It was found that titanic acid dissolves more easily in acid solution at low temperature than from solution at higher temperature. In a preferred embodiment the titanic acid is precipitated from a solution at temperature lower than 90° C. In a more preferred embodiment the titanic acid is precipitated from a solution at temperature lower than 50° C., and in a more preferred embodiment the titanic acid is precipitated from a solution at temperature lower than 30° C.

In order to have a process for the industrial production of TiX4, the production cost should not be high.

In order to do so, a precipitation procedure for titanic acid was developed to yield easy dissolution of the titanic acid in HX solutions to produce the salt TP2 at high concentration It was found that titanic acid that is precipitated by the addition of a base to the titanyl salt TP1 solution dissolves more easily if it the solution is well stirred and its solubility in acidic solution is better it is precipitated from a lower pH level solution than from higher pH level. Thus local high pH level in solution results in difficulties in the dissolution of the produced. It was also found that the presence of sulfate salts in solution can contribute to the production titanic acid with high solubility.

In a preferred embodiment the titanic acid is precipitated by adding a base solution to a well stirred solution. In a more preferred embodiment the titanic acid is precipitated from a buffered solution. In a more preferred embodiment the buffered solution contains a sulfate ion or other acidic buffers.

In a preferred embodiment, the concentration of the buffer solution is higher than 10%. In a more preferred embodiment, the concentration of the buffer solution is higher that 20%. In the best embodiment the concentration of the buffer solution is close to its saturation concentration.

In preferred embodiment the titanic acid is precipitated by adding a base solution at concentration lower than 3M to TP1 solution. In a more preferred embodiment, the base solution is at concentration lower than 1M and in a more preferred embodiment the concentration of the base is lower than 0.5M.

In a preferred embodiment the base solution is a solution comprising of ammonia. In a more preferred embodiment the base solution is a solution comprising of ammonia and ammonium salt.

It was found that the solubility of titanium salts in many solvents is surprisingly high. For example, the concentration of titanyl chloride in methanol solution is higher than 25%. Thus solubility of titanium salts in the various alkanols is high enough to enable the industrial use of such solvents for the dissolution of the titanium salts and the precipitation of dry titanic acid from such solutions. Among the solvents one may choose from the group of alkanols, hydrophilic solvents such as acetone, solvents that produce complexes with titanium such as TBP, DMF, formamide, DMSO and others. Extractants such as the amine extractants that extract both the anion and cation of the titanium salts (thus forming a couple extractant) and acidic extractants such as DEHPA and others.

In order to enable thermal conversion of the salt TP3 it should have very low water content. High water content will result in thermal precipitation of Titanium oxides and/or oxidation of reduced titanium salts used in the process.

In a preferred embodiment the titanic salt is precipitated from a titanium salt TP1 in solvent solution. In a more preferred embodiment the solvent in the titanic salt solution is selected from a group comprising of methanol, ethanol, propanol, butanol or other alkanols, DMSO, N-containing hydrophilic solvents such as DMF, methyl formamide, formamide Pyridine, pyramiding and their derivatives and the combination thereof. I another preferred embodiment the solvent in the titanic salt solution is selected from a group comprising basic extracts and acidic extractants. aIn a preferred embodiment the titanic acid is precipitated from aqueous solution. In another preferred embodiment the titanic salt is precipitated from a water poor solution.

In a preferred embodiment, titanic acid is precipitated from a medium comprising of organic solvent.

It was found that removing water from the titanic acid prior to dissolving it in acid to produce the titanium containing product makes the next stages more simple and the production of the product TP becomes more feasible. Among the drying methods one may use washing the titanic acid with an hydrophilic solvent such as methanol or higher alkanol, extracting the water by passing a gas (such as air) over the product, using solid hygroscopic materials such as molecular sieve or drying under vacuum or any other drying method.

In another preferred embodiment, the titanium salt TP2 is dried after the dissolution of the titanic acid. Any drying method may be used.

In a preferred embodiment drying the titanic acid is done using method selected from washing with a solvent, contact with a gas, contact with a hygroscopic solid, contact with a concentrated solution or drying under vacuum or the combination thereof.

It was found that titanic acid can be dissolved in acidic solution to produce a titanium containing product TP2. For the purpose of producing titanium metal, the acid is selected from the group selected from acid halides and other acids with a pK value lower than 2.5 which are chemically stable at the conditions in which the reduction to titanium metal takes place.

In a preferred embodiment the titanic acid is dissolved in a solution containing a strong acid. In a more preferred embodiment the titanic acid is dissolved in a solution comprising of acid halide and in a more preferred embodiment the titanic acid is dissolved in HCl solution.

In a preferred embodiment the titanic acid is dissolved in aqueous solution. In a more preferred embodiment the titanic acid is dissolved in a solvent with low water content.

In a further more preferred embodiment the titanium containing product solution is dried to remove the water present in solution.

In another preferred embodiment, titanium containing product TP2 is crystallized to give a solid with low water content.

In another preferred embodiment, titanium containing product TP2 is crystallized to give a solid with low water content.

In another preferred embodiment, titanium containing product TP2 is crystallized to give a solid solvate wherein the solvate is selected from the group comprising of the acid HX or the solvent and the combination thereof.

In a more preferred embodiment TP2 is not solvated.

In a preferred embodiment the product TP2 is selected from a group comprising of titanium salts.

In a preferred embodiment the anion of the salt present in the salt TP2 is a mono valent anion. In a more preferred embodiment the anion of the salt TP2 is a halogen. In a more preferred embodiment the anion salt TP2 is Cl.

The Thermal Conversion Stage

Titanium salts $TP_3$ that can be thermally converted to TP
1. The titanium salt TP2 among which are the titanyl halides $TiOX_2$
2. Reduced titanium salts (such as $TiCl_3$, $TiCl_2$ $TiBr_3$ and $TiBr_2$)
3. Reduced oxo titanium salts (Such as TiOBr or TiOCl)

In a preferred embodiment the product TP is produced by a thermal decomposition of $TiOX_2$. In this case, TP3 is the titanium salt TP2.

$$TiOX_2 = TiX_4 + TiO_2 \quad \text{Eq. 1}$$

In a preferred embodiment the thermal decomposition of $TiOX_2$ is performed in medium comprising of $TiOX_2$, HF, fluoride containing salt and the combination thereof.

In a preferred embodiment the product TP is produced by a thermal decomposition of $TiX_3$ $$TiX_3 = TiX_4 + TiX_2 \quad T > 350° C. \quad \text{Eq. 2}$$

In a preferred embodiment the thermal conversion temperature is higher than 550° C. In a more preferred embodiment the temperature is higher than 600° C. In another embodiment the product TP is produced by a thermal.

In a preferred embodiment $TiCl_3$ is reacted with $TiO_2$ at temperature higher than 500° C. In a more preferred embodiment the reaction is performed at temperature higher than 650° C.

$$2TiX_3 + TiO_2 = 2TiOX + TiX_4 \quad \text{Eq. 3}$$

In a preferred embodiment $TiCl_3$ is reacted with $O_2$ at temperature higher than 500° C. In a more preferred embodiment the reaction is performed at temperature higher than 650° C.

$$3TiX_3 + 1/2 O_2 = TiOX + TiX_4 \quad \text{Eq. 4}$$

In a preferred embodiment $TiX_3$ is reacted with HX at temperature higher than 250° C. In a more preferred embodiment the reaction is performed at temperature higher than 400° C.

$$TiX_3 + HX = TiX_4 + 1/2 H_2 \quad \text{Eq. 5}$$

In a preferred embodiment the product TP is produced by a thermal decomposition of $TiX_2$ at temperature higher than 600° C. In a more preferred embodiment the reaction is performed at temperature higher than 700° C.

$$TiX_2 = TiX_4 + Ti \quad \text{Eq. 6}$$

In a preferred embodiment the product TP is produced by a thermal rearrangement of $$TiOX_2 + TiX_3 = TiX_4 + 2TiOX \quad \text{Eq. 7}$$

Conversion of Co-Products to TP3

1. Conversion of $TiO_2$

In a preferred embodiment, the product $TiO_2$ is converted to rutile at temperature higher than 600° C.

In a more preferred embodiment, the product $TiO_2$ is converted to TP using a process comprising:
i. Leaching with a solution comprising of a strong acid having a pK value higher than 2.5; and
ii. Formation of particles comprising of $TiOX_2$.

In a preferred embodiment, the product $TiO_2$ is reacted with a divalent titanium salt $TiX_2$ at temperature higher than 500° C.

$$TiO_2 + TiX_2 = 2TiOX \quad \text{Eq. 7}$$

$$TiOX + 2HX = TiX_3 + H_2O \quad \text{Eq. 9}$$

In a preferred embodiment the reaction described in Eq. 8 is higher than 600° C.

In a more preferred embodiment, the product $TiO_2$ is converted to TP using a process comprising of the steps $$TiO_2 + 2TiX_3 = 2TiOX + TiX_4 \quad \text{Eq. 10}$$

$$TiOX + 2HX = TiX_3 + H_2O \quad \text{Eq. 9}$$

In a preferred embodiment the thermal rearrangement is performed at temperature higher than 600° C. In a preferred embodiment the thermal rearrangement is performed at temperature higher than 650° C.

$$3TiOX = TiO_2 + TiX_3 \quad \text{Eq. 11}$$

In a preferred embodiment, the product $TiCl_2$ is converted to TP using a process comprising the steps of:

$$TiX_2 + TiOX_2 = TiOX + TiCl_3; \quad \text{Eq. 12}$$

$$TiOX + HX = TiX_3 + H_2O(gas); \text{ and} \quad \text{Eq. 13}$$

$$TiX_3 = TiX_4 + TiX_2; \quad \text{Eq. 14}$$

wherein the temperature in the step described in Eq. 12 is higher than 550° C.

Reduction of TP2

$TiX_4$ can be reduced to Ti(III) using the various reducing agents. There was no indication in the scientific literature that the same can be done using the titanyl ($TiOX_2$) salts as the raw material.

It was very surprisingly found that titanyl salts can be reduced using hydrogen to give TiOX (tested with $Ti_2OSO_4$ or Titanyl halogens such as $TiOCl_2$). The reaction proceeds very well with hydrogenation catalysts even at room temperature in aqueous or in solvent solutions. If the reduction is done in a very acidic solution, $TiX_3$ is produced instead of TiOX.

In a preferred embodiment Ti(IV) salt is reduced to Ti(III) salt. In a preferred embodiment the reduction is done in solution comprising of $TiOX_2$, hydrogen and a hydrogenation catalyst and the combination thereof.

If TiOX is produced it can be converted to $TiX_3$ by the addition of HX.

$$TiOXI_2 + H_2 = TiOX + HX \quad \text{Eq. 15}$$

$$TiOX + 2HX = TiX_3 \quad \text{Eq. 16}$$

In a preferred embodiment Ti(IV) salt is reduced to give a Ti(III) salt by adding a reducing agent to a medium comprising of Ti(IV) salt.

In a preferred embodiment TP2 is converted to the product TP via the following route:

$$4TiOX_2 + \text{reductant } (4e-) = 4TiOX + \text{reductant } X_4 \quad \text{Eq. 17}$$

$$4TiOX + 8HX = 4TiX_3 + 4H_2O \quad \text{Eq. 18}$$

The water is removed during second stage 2 or between the second and the third stages.

$$4TiX_3 = 2TiX_4 + 2TiX_2 \text{ Thermal conversion} \quad \text{Eq. 19}$$

$$2TiX_2 = TiX_4 + Ti(0) \text{ Thermal conversion} \quad \text{Eq. 20}$$

Overall reaction $4TiOX_2 + 8HX = 3TiX_4 + 1Ti(0) + 4H_2O + \text{oxidized reductant}$.

In a preferred embodiment the anion X in Eq. 1—X is an anion, preferable a mono-valent anion, more preferable an anion selected from the group of halogens and the combination thereof and more preferable selected from the group composed of Cl or Br and the combination thereof.

In a preferred embodiment the reductant is $H_2$ and the reduction is done with a catalyst.

In a preferred embodiment the reductant is a metal.

In a more preferred embodiment the reductant is selected from the group comprising of titanium, magnesium, Sodium, iron and the combination thereof.

In a preferred embodiment the reductant is selected from a group comprising of an inorganic or organic reducing agent compound or the combination thereof.

In a more preferred embodiment the reductant in Eq 17 is $TiX_2$.

In a more preferred embodiment TP is produced in a process comprising the steps of:

$$2TiOX_2 + TiX_2 = TiOX + TiX_3 \text{ Reduction} \quad \text{Eq. 21}$$

$$TiOX + TiX_3 + 2HX = 2TiX_3 + 2H_2O \text{ Acidulation to get Product TP3} \quad \text{Eq. 22}$$

Eq. 23: The water is removed during Stage 2 or after this stage and before Stage 3.

$$TiX_3 = TiX_4 + TiX_2 \text{ Thermal conversion} \quad \text{Eq. 24}$$

$TiX_2$ is returned to Stage 1

Overall process $2TiOX_2 + 4HX = 2TiX_4 + 2H_2O$

Titanyl salts produced from reacting titanic acid with acids and especially the titanyl halides contain a significant amount of water. Due to its hygroscopic nature it is very difficult to remove the water. The thermal conversion of titanyl salts usually lead to the reaction $$TiOX_2 = TiO_2 + 2HX. \quad \text{Eq. 25}$$

Thus the thermal conversion product is $TiO_2$.

It was surprisingly found that $TiOX_2$ produced via the titanic acid route can be dried from water to such a level that it can be used for the thermal conversion reaction to form the TP product—$TiX_4$.

In a preferred embodiment the anion in equations 1-25 is selected from the group comprising of Cl, Br, I and F and the combination thereof.

In a preferred embodiment the product TP in equations 1-25 is selected from the group comprising of $TiCl_4$, $TiBr_4$, $TiI_4$ and $TiF_4$ and the combination thereof.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Precipitation of Titanic Acid 1 kg of 10% $TiOSO_4$ solution and 4.5 kg of 5% $NH_3$ solution were added into a vial. The suspension was filtered and washed with water. 1 kg of the wet cake was washed 3 times with ethyl acetate to remove the traces of water. 550 gr of the resulting homogenous suspension was added into a vial. 50 gr of gaseous HBr was added into the suspension while mixing for 2 hours. The precipitate (A) was filtered and dried.

EXPERIMENT 2

10 gr of dry precipitate obtained in Experiment 1 were added into a beaker. $N_2$ at 300° C. was flowing through the vial. The outlet gas was cooled to 20° C. and the liquid was analyzed and found to be $TiCl_4$. The remaining solids were washed and analyzed. The solids were found to be $TiCl_2$

EXPERIMENT 3

10 gr of dry precipitate obtained in Experiment 1 were added into a beaker. $N_2$ at 300° C. was flowing through the vial. The outlet gas was cooled to 20° C. and the liquid was analyzed and found to be $TiCl_4$. The liquid and 0.2 gr of 0.5% Pd/carbon catalyst were introduced into a parr unit (high pressure mixed reactor). Gaseous Hydrogen was introduced for 4 hours at 120° C. and 20 atm for. The gas was released and cooled. The exiting gas contained HCl. 2.51 gr of purple solid (C), found to be $TiCl_3$ remained in the parr. 2.51 gr of the remaining solid was heated (Under $N_2$) to 500° C. Gas was released slowly and found to contain $TiCl_4$. After 1 hour the parr unit was opened. The remaining solid (D) was analyzed and found to contain $TiCl_2$. 1 gr of solid (D) was heated in a ceramic tube to 900° C. for 4 hours. $TiCl_4$ was released and collected at 20° C. The tube was cooled and opened. The solid found in the tube was analyzed and found to be Ti metal.

EXAMPLE 4

1 kg of 10% $TiOSO_4$ solution and 4.5 kg of 5% $NH_3$ solution were added into a vial. The suspension was filtered and washed with water. 550 gr of the resulting cake was added into a vial. 50 gr of gaseous HCl was added into the suspension while mixing to obtain a clear solution. 200 gr of clear solution and 2 gr of Pd/carbon catalyst were introduced into a parr unit and mixed at 100° C. $H_2$ gas was introduced for 3 hours. After 3 hours the temperature was raised to 120° C. and the gas was allowed to exit. The exiting gas contained water, HCl and $H_2$. After 3 hours, the Parr was cooled and open. $TiCl_3$ particles were found. The temperature in the parr is than increased to 500° C. The gas exiting the parr unit is cooled and found to be $TiCl_4$. After 3 hours the parr unit is cooled and opened. Solid particles are present in the parr. The solid is found to be $TiCl_2$.

10 gr of $TiCl_2$ produced in the previous step is introduced into a ceramic tube. The tube is heated to 900° C. The gas exiting the tube is cooled and analyzed and is found to be $TiCl_4$. After 3 hours, the tube is cooled to RT. Titanium metal is found in the tube.

EXAMPLE 5

1 kg of 10% $TiOSO_4$ solution and 4.5 kg of 5% $NH_3$ solution were added into a vial. The suspension was filtered and washed with water. 550 gr of the resulting cake was added into a vial. 60 gr of gaseous HBr was added into the suspension while mixing to get a clear solution. 200 gr of clear solution and 2 gr of Pd/carbon catalyst were introduced into a parr unit and mixed at 100° C. $H_2$ gas was introduced for 3 hours. After 3 hours the temperature was raised to 120° C. and the gas was allowed to exit. The exiting gas contained water, HBr and $H_2$. After 3 hours, the Parr was cooled and open. $TiBr_3$ particles were found.

The temperature in the parr is than increased to 500° C. The gas exiting the parr unit is cooled and found to be $TiBr_4$. After 3 hours the parr unit is cooled and opened. Solid particles are present in the parr. The solid is found to be $TiBr_2$.

10 gr of $TiBr_2$ produced in the previous step is introduced into a ceramic tube. The tube is heated to 900° C. The gas exiting the tube is cooled and analyzed and is found to be $TiBr_4$. After 3 hours, the tube is cooled to RT. Titanium metal is found in the tube.

It will be evident to those skilled in the art that the invention is not limited to the details of the foregoing examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for the industrial production of a titanium salt TP comprising:
   (i) precipitating titanic acid from a solution comprising titanium salt TP1,
   (ii) producing a titanium containing product TP2 from a medium comprising of said titanic acid obtained from step (i) and an acid;
   (iii) converting said titanium containing product TP2 obtained from step (ii) to a titanium containing product TP3 by a method selected from the group consisting of dehydration, acidulation, reduction and combinations thereof; and
   (iv) thermally converting said titanium containing product TP3 obtained from step (iii) to a titanium salt TP at temperature higher than 170° C.,
   wherein,
   TP3 is a mixture of at least two titanium salts selected from the group consisting of $TiOX_2$, TiOX, $TiX_3$, $TiX_2$ and a combination thereof;
   wherein X is a halide.

2. A method according to claim 1, further comprising processing said titanium salt TP to produce titanium metal.

3. A method according to claim 1, wherein said titanium containing product TP3 is selected from the group consisting of $TiCl_3$, TiCl, $TiBr_3$, $TiBr_2$ and a combination thereof.

4. A method according to claim 1, wherein TP1 is a titanyl salt.

5. A method according to claim 1 wherein the titanium salt TP1 is produced from a solution obtained by leaching of Ilmenite or other titanium containing ores.

6. A method according to claim 1, further comprising purifying the titanium salt TP1 to give a solution with a ratio between titanium to all polyvalent cations of higher than 99%.

7. A method according to claim 6, wherein the purification method is selected from the group consisting of crystallization, extraction, adsorption upon a cation exchangers, distillation and a combination thereof.

8. A method according to claim 6, wherein the purification method is selected from the group consisting of crystallization of titanium salt and the crystallization of titanium double salt and a combination thereof.

9. A method according to claim 1 wherein the acid used for the production of the titanium containing product TP2 is a strong acid having a pK higher than 2.5.

10. A method according to claim 1, wherein the acid used for the production of the titanium containing product TP2 is selected from the group consisting of HCl, HBr, HI, $HNO_3$, $H_2SO_4$, $H_3PO_4$ and a combination thereof.

11. A method according to claim 1, wherein said titanium containing product TP3 is dried to remove water in step (iii).

12. A method according to claim 1, wherein said titanium containing product TP2 is reduced with a reducing agent in step (iii).

13. A method according to claim 12, wherein said reducing agent is selected from the group consisting of hydrogen, inorganic reducing agents, metals, organic reducing agents and the combination thereof.

14. A method according to claim 1, wherein said titanium containing product TP3 is obtained by reduction of TP2 with a reducing agent in step (iii).

15. A method according to claim 12, wherein said reducing agent is selected from the group consisting of $TiX_2$, $TiX_3$, TiOX, titanium metal and a combination thereof.

16. A method according to claim 12, wherein said reducing agent is a metal selected from the group consisting of magnesium, iron, zinc aluminum and a combination thereof.

17. A method according to claim 1, wherein said reduction in step (iii) is done in a medium consisting of hydrogen and a hydrogenation catalyst.

18. A method according to claim 1, wherein one of said titanium salt TP3 is $TiOX_2$.

19. A method according to claim 1, wherein step (iv) is performed at temperature higher than 250° C.

20. A method according to claim 1, wherein TP3 comprises $TiOX_2$ and a titanium containing salt selected from the group consisting of $TiX_3$, $TiX_2$ and TiOX.

21. A method according to claim 1, wherein TP3 is a titanium salt selected from the group consisting of $TiX_3$, TiOX, and a combination thereof.

22. A method according to claim 1, wherein step (iv) is performed at temperature higher than 450° C.

23. A method according to claim 1, wherein step (iv) is performed at temperature higher than 600° C.

24. A method according to claim 1, wherein one of TP3 is $TiX_2$.

25. A method according to claim 1, wherein step (iv) is performed at temperature higher than 700° C.

26. A method according to claim 1, wherein step (iv) produces a product selected from the group consisting of $TiX_4$ and $TiO_2$.

27. A method according to claim 26, further comprising leaching $TiO_2$ with an acid selected from the group consisting of acid halide, $H_2SO_4$ and a combination thereof.

28. A method according to claim 27, further comprising processing said leaching product to produce the product TP.

29. A method according to claim 26, further comprising reacting $TiO_2$ with $TiX_2$.

30. A method according to claim 1, wherein the product of said method comprising TiOX.

31. A method according to claim 1, wherein one of said titanium salt TP3 is $TiX_3$ and step (iv) is performed at temperature higher than 450° C.

* * * * *

UNITED STATES PATENT AND TRADEMARK OFFICE
CERTIFICATE OF CORRECTION

PATENT NO.        : 8,628,736 B2  Page 1 of 1
APPLICATION NO. : 12/666947
DATED             : January 14, 2014
INVENTOR(S)       : Asher Vitner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this
Twenty-second Day of September, 2015

Michelle K. Lee
*Director of the United States Patent and Trademark Office*